United States Patent [19]

Fassett, II

[11] Patent Number: 4,794,698

[45] Date of Patent: Jan. 3, 1989

[54] GRAPHICS CUTTING SYSTEM AND METHOD FOR SHEET MATERIALS

[76] Inventor: James M. Fassett, II, 7835 Quebrada Cir., Carlsbad, Calif. 92008

[21] Appl. No.: 943,170

[22] Filed: Dec. 18, 1986

[51] Int. Cl.$^4$ .................................................. B26D 3/08
[52] U.S. Cl. .................................... 33/18.1; 33/23.11; 33/26; 33/504
[58] Field of Search .................. 33/18.1, 23.11, 26, 33/504; 83/879, 880, 902; 346/139 C

[56] References Cited

U.S. PATENT DOCUMENTS

| | | | |
|---|---|---|---|
| 2,743,348 | 4/1956 | Boyajean | 346/139 C |
| 3,035,267 | 5/1962 | Vogtlin | 346/139 C |
| 3,138,875 | 6/1964 | Christensen | 33/18.1 |
| 3,158,936 | 12/1964 | Virta | 33/18.1 |
| 3,384,965 | 5/1968 | Sicking | 33/18.1 |
| 3,435,528 | 4/1969 | Ferchland et al. | 33/18.1 |
| 3,593,426 | 7/1971 | Domagalski | 33/18.1 |
| 4,324,047 | 4/1982 | Roch | 33/18.1 |
| 4,512,839 | 4/1985 | Gerber | 83/880 |

Primary Examiner—William D. Martin, Jr.
Attorney, Agent, or Firm—Baker, Maxham & Jester

[57] ABSTRACT

A system for generating and cutting graphic illustrations from sheets includes a microprocessor with graphics programming with suitable input such as a digital pad connected to a graphics plotter having an adaptor for converting the graphics plotter to a sheet cutter, which includes a scribe holder having the size and configuration of a graphics pen for the plotter for substituting for the pen in the plotter with the scribe holder including a pointed scribe having an omni-directional cutting tip with the ability to cut sheet materials when forced in any direction about its axis.

12 Claims, 1 Drawing Sheet

U.S. Patent   Jan. 3, 1989   4,794,698
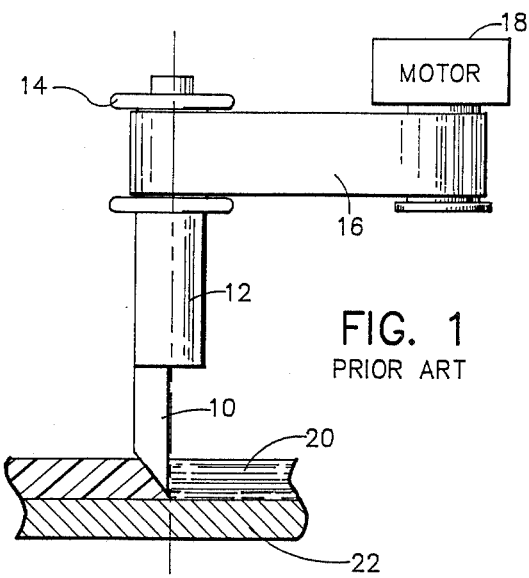
FIG. 1 PRIOR ART
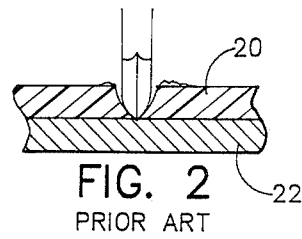
FIG. 2 PRIOR ART
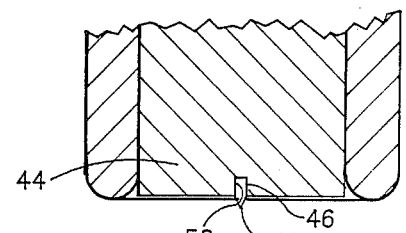
FIG. 4
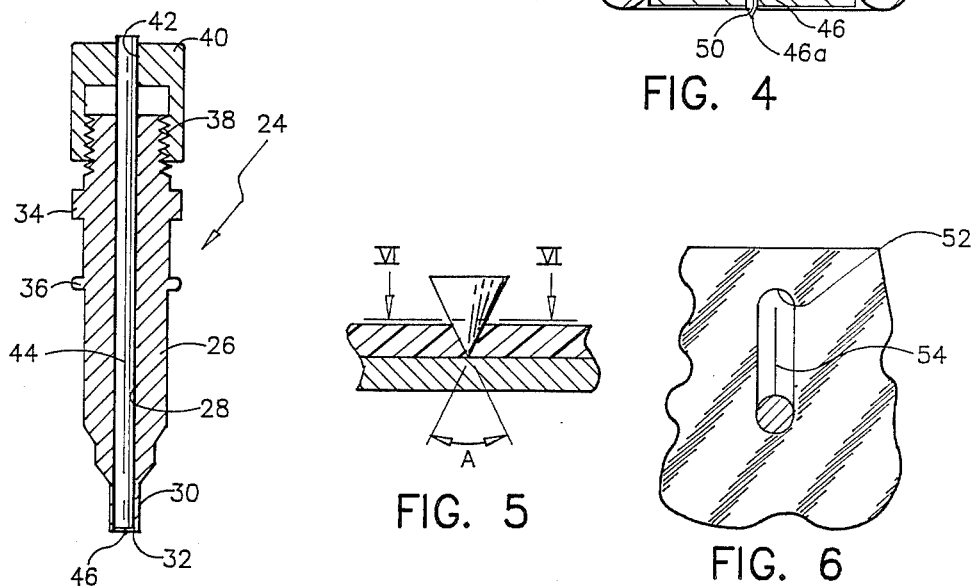
FIG. 3
FIG. 5
FIG. 6
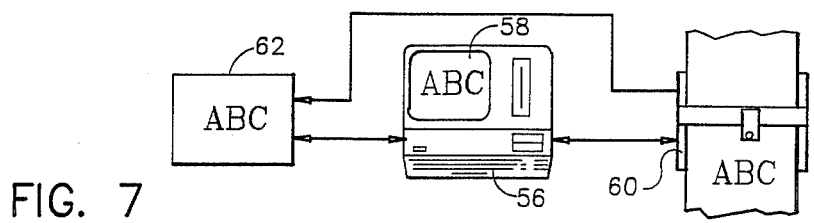
FIG. 7

GRAPHICS CUTTING SYSTEM AND METHOD FOR SHEET MATERIALS

BACKGROUND OF THE INVENTION

The present invention relates to computer controlled pattern cutting machines and pertains particularly to a system including means for adapting graphics plotters to sheet cutting machines.

Many sign makers in recent years have gone to paste on vinyl lettering in place of painted letters of the past. The development of thin plastic films, such as vinyl films has enabled this development to take place. Most sign lettering today is formed from thin sheets of vinyl having a strong adhesive on the back surface thereof for mounting on sign boards, panels and the like. A suitable film for this purpose is available and has been available from the 3M Company under the Trademark "Scotchcal" film. This material comes in the form of a thin sheeting of vinyl on the order of approximately three thousandths of an inch thick mounted on a wax paper backing or carrier.

Up until approximately four to five years ago, lettering was cut from such sheets by means of patterns or the like or by hand. Approximately four to five years ago, a letter cutting machine similar to a computer controlled plotter was developed by Gerber Scientific Products, Inc. for the purpose of cutting forms and lettering from this sheet material. The Gerber Scientific Products, Inc. machines are available in two models identified as the GSP Signmaker IV or Graphix 4. These machines have a sheet feed or roll feed device in the form of a pin sprocket or tractor feed as they are sometimes termed with a movable carriage having a knife rotably mounted thereon for cutting the desired patterns.

The mechanism of the presently available device utilizes a knife and carriage arrangement, as illustrated in FIG. 1, wherein a knife blade 10 is mounted on the end of a rotatable shaft 12, which is mounted in a shaft such that the shaft will rotate about an axis corresponding to the point of the knife 10. The shaft 12 is rotated about this axis by means of a sprocket and drive arrangement comprising a sprocket 14 driven by a belt 16 from a motor 18, which is in the form of a stepper motor or a synchronous motor. The motor is programmed along with the carriage and drive such that the knife is constantly rotated to follow curves in the graphics cutting.

A sheet of material such as a Vinyl sheet 20 on a wax paper backing 22, such as that of the 3M product, is fed past the knife by means of a sprocket drive as previously pointed out. The motor 18 is constantly driven to rotate the knife such that the knife points in the direction of the cut in forming the curvatures of the graphics, as shown in FIG. 2. The knife cuts or severs the Vinyl sheeting 20 without extending throught he wax paper backing 22. The cuts are made by a combination of movement of the knife and the sheeting.

Such machines, while satisfactory for many applications, have a number of drawbacks. One of the major drawbacks is the complexity of computer software necessary to maintain the proper control of the knife blade to assure its proper orientation following the curves of the necessary pattern. Other drawbacks include the problem with maintaining the proper orientation by means of the knife rotating drive mechanism. Other drawbacks include the complexity and expense of the device.

I have been in the sign business for many years and have used these machines since their introduction, approximately four to five years ago. In view of the problems with such machines, I have endeavored for the past four years to find or develop an alternative cutting mechanism for replacing such machines. One approach has been to attempt to find some means for adapting the conventional computer controlled graphics plotter to the cutting process. These graphics plotters are available which take the output from a microprocessor or suitable computer and convert it to graphic illustration on sheets fed through the plotter. The plotters employ one or more ink pens, typically felt tip pens, which under the direction and control of the microprocessor follow the desired patterns and form the patterns in ink on sheets of paper on the plotter. Over four years of efforts to find some means or develop some means for employing standard plotters for cutting have until just recently been unsuccessful.

Recently, I conceived and developed the subject of the present invention which is capable of converting the standard ink pen plotters to a computer controlled sheet cutter.

SUMMARY AND OBJECTS OF THE INVENTION

In accordance with the primary aspect of the present invention, an adaptor for a graphics plotter includes a pen-like holder having a hardened substantially conical point scribe mounted therein for tracing and cutting a graphic pattern on a sheet of material fed through the graphic plotter.

BRIEF DESCRIPTION OF THE DRAWING

The above and other objects and advantages of the present invention will become apparent from the following description when read in conjunction with the drawings wherein:

FIG. 1 is a diagrammatic illustration of the prior art;

FIG. 2 is an enlarged detail view of the cutting point of the device of FIG. 1;

FIG. 3 is an elevation view partially in section of my adaptor;

FIG. 4 is an enlarged and detail view of the cutting tip of my adaptor;

FIG. 5 is an enlarged detail view showing the cutting tip in operation cutting a sheet;

FIG. 6 is a view taken generally on lines VI—VI of FIG. 5; and

FIG. 7 illustrates a system in accordance with my invention.

DETAILED DESCRIPTION OF A PREFERRED EMBODIMENT

Referring to FIG. 3 of the drawings, an adaptor in accordance with my invention is illustrated. This adaptor comprises a holder having the general configuration size and shape of a standard pen for fitting the particular graphics plotter which is being adapted. The holder, designated generally by the numeral 24, comprises a generally cylindrical body member 26 having a central axial bore 28 for receiving a scribe as will be subsequently described. The body has a forward tapered or small diameter tip 30 terminating at an annular end surface 32. A pair of ribs 34 and 36 for mounting the holder in a particular plotter is also illustrated. The body includes a threaded upper end or threaded portion 38 which receives a cap 40 having a bore 42 in which is mounted an elongated shank 44 having a cutting tip 46 in the lower end thereof.

The shank 44 slideably fits within the bore 28 and is secured to the cap 40 by means of press fitting therein, or by means of a suitable set screw or the like (not shown). With this arrangement, rotation of the cap 40 forces it along the threads 38, forcing the shaft 44 to move therewith, thereby adjusting the protrusion of the cutting point 46 beyond the end 32. This provides an adjustment of the depth of cut up to the length of the extension of the tip beyond the end 32.

Referring more specifically to FIG. 4, the cutting tip 46 is primarily in the form of a generally conical shaped hardened insert mounted within the end of the shaft 44, such as by embedding in a recess or bore 50. The cutting tip may be formed of any suitable material having the necessary hardness and capability of being formed into the desired conical or other suitable point or shape. One suitable material which has been tried and found highly satisfactory is that of a diamond. The diamond is preferably formed in a generally conical shape forming the tip or point 46a. The point could also have the general configuration of a pyramid, preferably with more than four sides. This is essentially what I term a scribe.

Referring to FIG. 5, the conical tip has an angle "A" which is shaped and of a degree to provide the desired cutting ability, yet at the same time provides the necessary strength to be able to be forced through the sheet matrial which is being cut. I have found that angles on the order of from approximately twenty degress up to about one-hundred degrees have been found to perform satisfactory. The angle of the point will in most cases depend upon the material to be cut. The tougher the material, the larger the angle will have to be to provide the strength necessary to support the point. On the other hand, the smaller the angle, the sharper the cutting edge formed by the tip will be. One desired angle, particularly for Vinyl sheet material, is on the order of about sixty degrees. This provides an optimum strength and sharpness for the cutting ability.

The tip, when viewed from the side, i.e. at a right angle to the axis thereof, presents a rounded cutting edge that is the same from any position around the axis. Thus, there is no need to rotate the tip to present the cutting edge to the material. The cutting tip is therfore an omni-directional cutting tip.

In application to the cutting of Vinyl sheets for lettering and the like, the cutting tip should have an extension length of on the order of 0.005 to 0.007 inches in length. This is sufficient to extend and cut through the conventional Vinyl sheeting, which is on the order of approximately 0.003 inches in thickness and not yet cut through the support or backing sheet. The roundness or radius of the point must be sufficiently small such that it presents essentially a sharp point. I have found that a radius of on the order of 0.002 inches in diameter proves satisfactory for the cutting of Vinyl sheeting. Preferably, the radius should be between from 0.00001 up to just under 0.007.

In accordance with my invention, a system such as illustrated in FIG. 7 comprising, for example, a computer or microprocessor 56 having a video screen 58 and suitable graphics hardware is appropriately connected to a graphics plotter 60. Suitable plotters are available from CalComp Division of Sanders Corp. of Anaheim, Calif., such as the CalComp Model 1044. Other suitable plotters are available from other companies such as Hewlett-Packard Corp. of Palo Alto, Calif. The plotter 60 is preferably the drum type wherein up to one-hundred foot rolls of Vinyl sheeting is fed therethrough. The feeding of the sheet may be by friction feed or by sprocket or tractor feed. The latter provides a more positive drive. A suitable input means 62, such as a digitizer, a graphics pad, or other suitable input may be available in the system.

In operation, a computer controlled graphics plotter is selected, and the ink pens or pen therein is replaced by means of a scribe cutter, as illustrated in FIGS. 3 and 4. The appropriate graphics software is run on the system and as the plotter is operated to trace out the graphic illustration of the pattern on the appropriate sheet of paper, Vinyl or the like that passes through the plotter, the appropriate pattern is cut therein. In the conventional manner, Vinyl sheeting is cut such that the outline of letters, figures or the like are cut free from the surrounding material. The material, such as lettering or the like to be transferred, is left on the wax paper backing as the surrounding material is peeled off. A transfer sheet having a low strength adhesive is then placed over the lettering, figures of the like and picks up the lettering from the wax sheet to be transferred to a suitable sign panel or the like. The transfer of the letters are then completed and the transfer sheet peeled away leaving the lettering, graphics or the like on the sign backing.

While the present invention has been illustrated and described by means of specific embodiments, it is to be understood that numerous changes and modifications may be made therein without departing from the spirit and scope of the invention as defined in the appended claims.

I claim:

1. An adaptor for converting a graphics plotter to the cutting of patterns, comprising:
   an adjustable holder for mounting in a fixed position on a pen mount of a graphics plotter carriage, said holder having means for adjustably positioning and holding a cutting tip in a selected fixed position relative to a sheet to be cut; and
   omni-directional cutting tip means mounted in said holder for positioning into engagement with a sheet to be cut for cutting a sheet in any direction of movement of said tip means.

2. An adaptor according to claim 1 wherein:
   said cutting tip means has a generally conical configuration.

3. An adaptor according to claim 1 wherein:
   said cutting tip means has an angle of between about thirty and forty-five degrees.

4. An adaptor according to claim 1 wherein:
   said tip has a length of about 0.005 inches.

5. An adaptor according to claim 2 wherein:
   said tip means has a length of 0.005 inches.

6. An adaptor according to claim 5 wherein:
   said tip means has a radius of between 0.0001 and 0.002 inches.

7. An adaptor according to claim 6 wherein:
   said holder has a generally cylindrical configuration with an axial bore;
   an elongated shaft mounted in said axial bore;
   said cutting tip means is mounted on an end of said shaft; and
   said means for adjusting comprises means for adjustably moving said shaft along said bore.

8. A pattern cutting system for cutting selected patterns in sheet material, said system comprising:
   a microprocessor having graphics capabilities;
   graphics program means for said microprocessor;
   input means for inputting a selected pattern into said microprocessor;
   a graphics plotter connected to said microprocessor and including means for generating selected graphic patterns on sheet material therein;
   cutting means comprising a holder having a generally cylindrical configuration with an axial bore for mounting on said plotter for cutting said sheet material in said graphic patterns;
   an elongated shaft adjustably mounted in said axial bore for positioning in selected fixed positions in said bore;
   an omni-directional cutting tip having a generally conical configuration mounted on an end of said shaft, said cutting tip means has an angle of between about thirty and forty-five degrees; and
   said cutting tip means has an angle of between about thirty and one-hundred twenty degrees.

9. A pattern cutting system according to claim 8 wherein:
   said tip means has a length of 0.005 inches.

10. A pattern cutting system according to claim 8 wherein:
    said tip means has a radius of between 0.0001 and 0.002 inches.

11. An adaptor for converting a computer controllable graphics plotter of the type having a moveable carriage and at least one ink pen detachably mounted thereon to the cutting of patterns, comprising:
    a holder for mounting on a pen mount of a graphics plotter carriage for holding a cutting tip in selected fixed positions;
    omni-directional cutting tip means mounted in said holder for positioning into engagement with a sheet to be cut for cutting a sheet in any direction of movement of said tip means;
    said cutting tip means has a generally conical configuration, an angle of between about thirty and one-hundred twenty degrees, a length of about 0.005 inches, and a radius of between about 0.0001 and 0.002 inches;
    said holder has a generally cylindrical configuration with an axial bore;
    an elongated shaft mounted in said axial bore;
    said cutting tip means is mounted on an end of said shaft; and
    said holder includes adjusting means for adjustably moving said shaft to selected fixed positions along said bore for adjusting the depth of cut of said cutting tip.

12. An adaptor according to claim 1 wherein said holder includes an annular surface for engagement with the surface of a sheet to be cut, and said depth of cut is adjusted by adjustment of the extension of said cutting tip beyond said annular surface.

* * * * *